(12) United States Patent
Lefurgy et al.

(10) Patent No.: US 8,448,108 B2
(45) Date of Patent: May 21, 2013

(54) MATCHING SYSTEMS WITH POWER AND THERMAL DOMAINS

(75) Inventors: Charles Robert Lefurgy, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/170,864

(22) Filed: Jun. 28, 2011

(65) Prior Publication Data

US 2013/0007682 A1  Jan. 3, 2013

(51) Int. Cl.
*G06F 17/50* (2006.01)
(52) U.S. Cl.
USPC .......................................... 716/106; 716/133
(58) Field of Classification Search
USPC .................. 716/100, 101, 106, 110, 111, 133
See application file for complete search history.

(56) References Cited

U.S. PATENT DOCUMENTS

| | | | |
|---|---|---|---|
| 6,191,645 | B1 | 2/2001 | Diegele |
| 6,389,582 | B1 | 5/2002 | Valainis et al. |
| 2005/0165881 | A1* | 7/2005 | Brooks et al. ................. 709/200 |
| 2007/0098037 | A1 | 5/2007 | Hamann et al. |
| 2009/0024969 | A1 | 1/2009 | Chandra |
| 2009/0224356 | A1 | 9/2009 | Chandra |

* cited by examiner

*Primary Examiner* — Sun Lin
(74) *Attorney, Agent, or Firm* — Garg Law Firm, PLLC; Rakesh Garg; Eutus D. Nelson

(57) ABSTRACT

A system, and computer program product for matching systems with power and thermal domains are provided in the illustrative embodiments. A subset of the set of systems is sorted according to size to form a sorted list of systems. The smallest remaining system in the sorted list of systems is selected. The smallest remaining system is allocated to a domain responsive to a determination that the domain can service the smallest remaining system. A system from a second subset is allocated to a plurality of domains such that the plurality of domains includes a smallest number of domains from the set of domains.

10 Claims, 6 Drawing Sheets

MATCHING SYSTEMS WITH POWER AND THERMAL DOMAINS

BACKGROUND

1. Technical Field

The present invention relates generally to a system, and computer program product for designing an integrated circuit. More particularly, the present invention relates to a system, and computer program product for improving the distribution of electrical power and cooling capacity in a data processing environment by matching systems with power and thermal domains present in the data processing environment.

2. Description of the Related Art

Data processing environments often include multiple data processing systems. The data processing systems each have a need for electrical power for performing their respective functions. Heat is a byproduct of consuming electrical power to perform these functions.

A power domain is an electrical power distribution system under a computer system's control. The level of electrical power (power) provided by the power distribution system is typically controllable from an application executing in the computer system controlling the power domain or a different computer system.

A power domain can supply power to several data processing systems. Conversely, a data processing system can receive power from more than one power domain.

A thermal domain is analogous to a power domain except that instead of serving electrical power, a thermal domain serves cooling capacity under a computer system's control. For example, a thermal domain may include one or more heating ventilation and air conditioning (HVAC) units, under the control of a controller. An example of a thermal domain could be a fan zone inside a server such that the hardware in the zone is cooled by a particular fan or set of fans).

A thermal domain can supply cooling capacity, or maintain a desirable operating temperature, for several data processing systems. Conversely, a data processing system can receive the required amount of cooling from more than one thermal domain.

SUMMARY

The illustrative embodiments provide a system, and computer program product for matching systems with power and thermal domains. An embodiment sorts a subset of the set of systems according to size to form a sorted list of systems. The embodiment selects the smallest remaining system in the sorted list of systems and allocates the smallest remaining system to a domain in response to a determination that the domain can service the smallest remaining system. The embodiment allocates a system from a second subset to a plurality of domains such that the plurality of domains includes a smallest number of domains from the set of domains.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
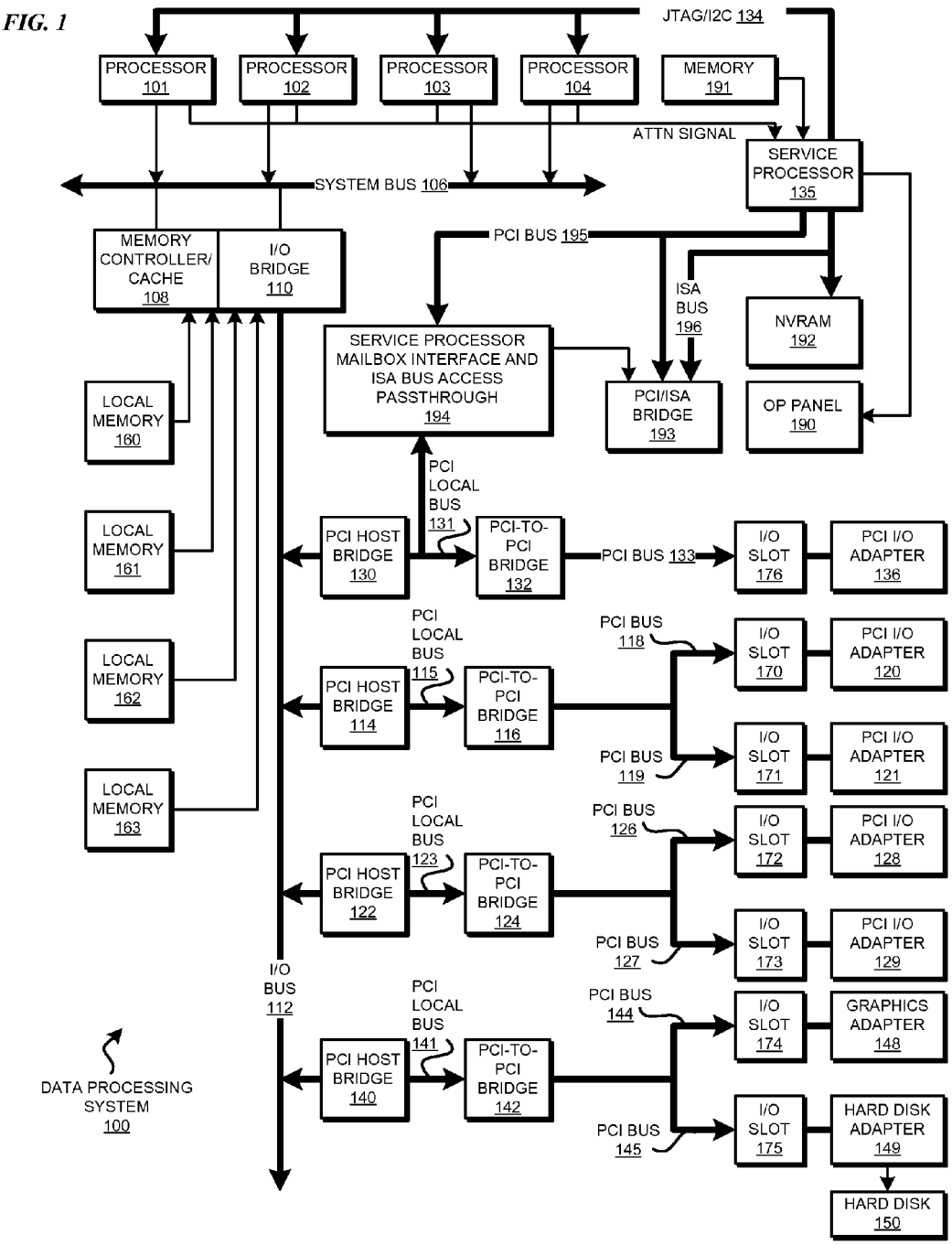
FIG. 1 depicts a block diagram of a data processing system in which the illustrative embodiments may be implemented is depicted.

In certain data processing environment configurations, several data processing systems may be configured to receive power from an electrical power domain. For example, a power domain may supply power to more than one physical computer in a network. As another example, a power domain may supply electrical power to several logical or virtual data processing systems executing on one or more host systems. As another example, a power domain may supply some or all of the power requirements of several partitions in a partitioned data processing system.

Physical data processing systems, virtual data processing systems, logically or physically partitioned data processing systems, and other data processing system configurations are collectively referred to as "systems" in this disclosure. A physical partition, or a physically partitioned system, is a set of components that are independently manageable in some respect. For example, a board with several components and its own power supply unit can be considered a physical partition in a data processing system. An embodiment described with respect to a system is applicable to a standalone computer, a virtual machine, a logical partition, a physical partition, or a host computer including a combination of physical and virtual machines in a similar manner.

A system can receive power from more than one power domains in that power domains are associated with physical boundaries within a system, such as with specific processors and memory boards. For example, a partition, such as a logical partition, may be defined to include processor 1 from board 1 in power domain 1 and processor 2 from board 2 in power domain 2. As another example, a partition, such as a physical partition, may be defined to include the components on a given board which receive power from one power domain but is cooled using multiple thermal domains.

The invention recognizes that power and thermal domains are becoming increasingly visible in data processing environment planning, configuration, and operations. As an analogy, just as a system's memory requirements are carefully planned for configuring the system, a system's power requirements and cooling requirements are also being carefully planned instead of simply connecting the system and powering it on.

The invention further recognizes that controlling power and temperature at their respective domain levels is advantageous in a data processing environment. For example, operating parameters can be optimized or stabilized at a domain level much more easily than at individual system level.

The invention further recognizes that if systems are not matched to appropriate power and thermal domains, certain data processing environment configurations can lead to inefficient utilization of the power capacity of the power domains and thermal capacities of the thermal domains. For example, a data processing environment can have several partitions (logical, physical, or a combination thereof) using five different power domains at between twenty and fifty percent utilization. Such loading causes five power domains to be operational, causing each domain to incur the fixed overhead costs, power conversion losses due to inefficiencies in the power delivery through the power supply and voltage regulators in the power domain, equipment aging, and possibly also redundant staff and equipment to monitor them.

The invention further recognizes that matching systems to power and thermal domains allows a data processing environment to be better configured for fault tolerance. For example, a fault in the electrical system may expose the various systems to loss of service if power is managed at each individual system level, whereas, when managed as a power domain, a fault at one power domain can be easily remedied by switching the systems over to another power domain. As another example, if only three of five available power domains can be used with increased utilization, the data processing environment can remain operational after an electrical fault by bringing online the remaining two unused power domains. A faulty domain is also more easily isolated than isolating each individual system from fault.

The illustrative embodiments used to describe the invention generally address and solve the above-described system-to-domain matching problems. The illustrative embodiments provide a system, and computer program product for matching systems to power and thermal domains.

The invention and various embodiments thereof are described herein primarily with respect to power domains only for the clarity of the disclosure. The concepts, methods, products, systems, operations, actions, configurations, or manipulations described herein with respect to matching a system to a power domain are similarly applicable to matching the system to a thermal domain.

Furthermore, several embodiments are described using a partition only as an example for the clarity of the description. An embodiment may be practiced with respect to a physical or logical data processing system of any configuration in a similar manner within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
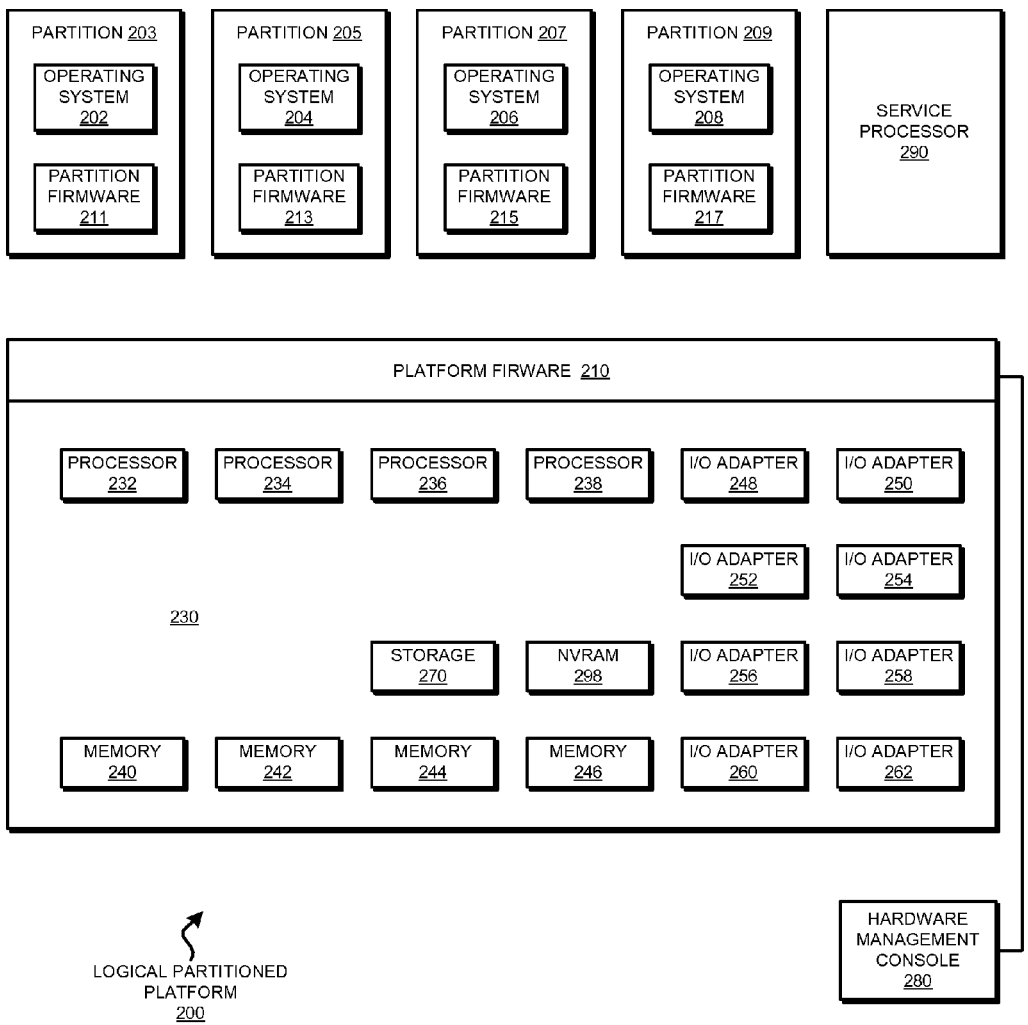
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three logical partitions. In these examples, memories 160-163 may take the form of dual in-line memory modules (DIMMs). DIMMs are not normally assigned on a per DIMM basis to logical partitions. Instead, a logical partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (ATX®) operating system may be executing within logical partition P1, a second instance (image) of the AIX operating system may be executing within logical partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses. However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, data processing system 100 in FIG. 1.

Logically partitioned platform 200 includes logically partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which are designed to interface with a partition management firmware, such as Hypervisor. IBM-i is used only as an example in these illustrative embodiments. Of course, may be used depending on the particular implementation. Operating systems 202, 204, 206, and 208 are located in logical partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these logical partitions also include partition firmware 211, 213, 215, and 217. Partition firmware 211, 213, 215, and 217 may be implemented using initial boot strap code, IEEE-1275 Standard Open Firmware, and runtime abstraction software (FTAS), which is available from International Business Machines Corporation. When logical partitions 203, 205, 207, and 209 are instantiated, a copy of boot strap code is loaded onto logical partitions 203, 205, 207, and 209 by platform firmware 210. Thereafter, control is transferred to the boot strap code with the boot strap code then loading the open firmware and RTAS. The processors associated or assigned to the logical partitions are then dispatched to the logical partition's memory to execute the partition firmware.

Logically partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple logical partitions within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the logical partitions. These services also may act as a service agent to report errors back to a vendor, such as International Business Machines Corporation. Operations of the different logical partitions may be controlled through a hardware management console, such as hardware management console 280. Hardware management console 280 is a separate data processing system from which a system administrator may perform various functions including reallocation of resources to different logical partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing logical partitions without departing from the scope of the invention.

Figure 3:
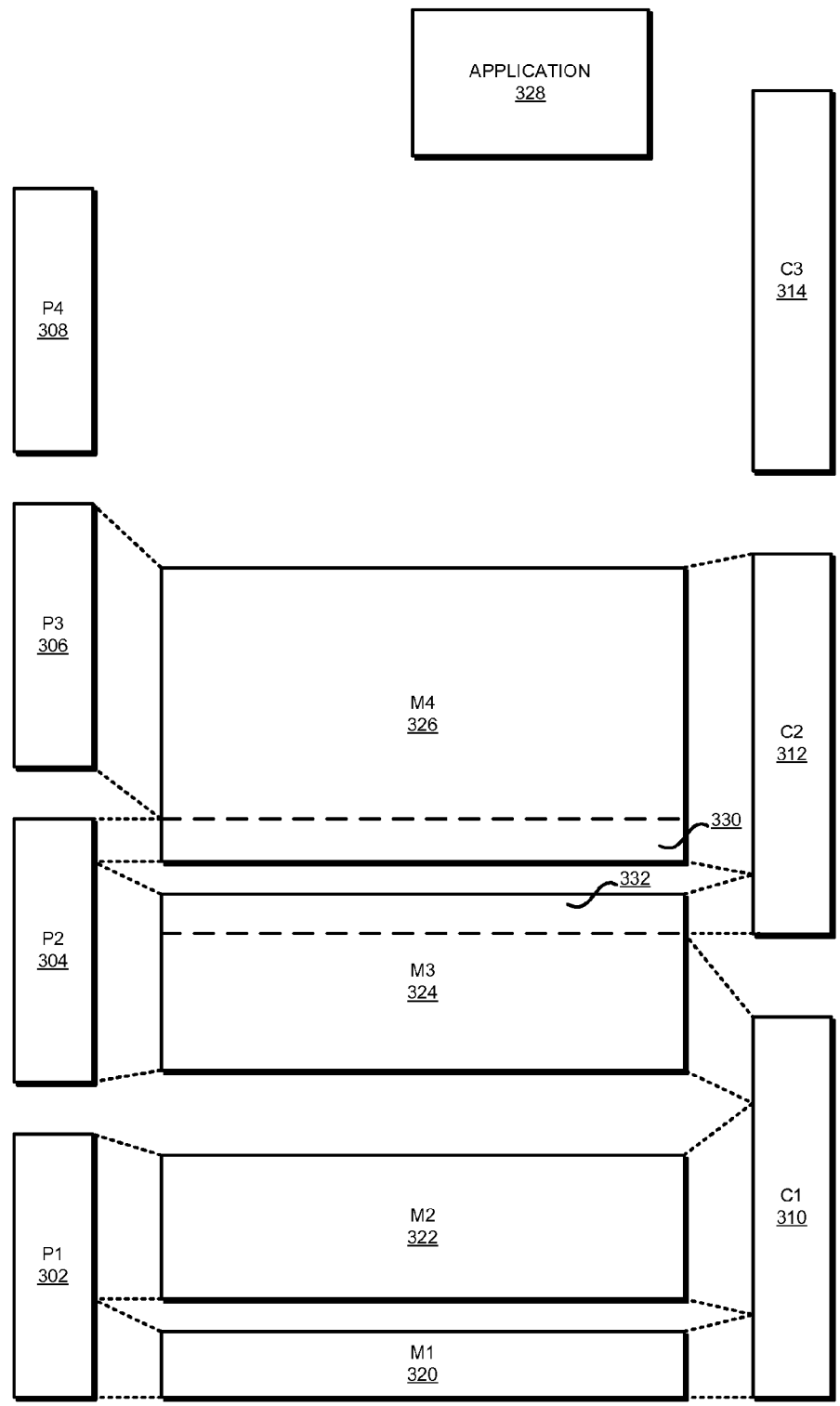
FIG. 3 depicts a block diagram of allocating systems to power and thermal domains in accordance with an illustrative embodiment.

With reference to FIG. 3, this figure depicts a block diagram of allocating systems to power and thermal domains in accordance with an illustrative embodiment. Power domains 302 (P1), 304 (P2), 306 (P3), and 308 (P4) are four example power domains in a data processing environment. Thermal domains 310 (C1), 312 (C2), and 314 (C3) are three example thermal domains in the data processing environment. Systems 320 (M1), 322 (M2), 324 (M3), and 326 (M4) may be example partitions in the data processing environment, such as logical partitions 203, 205, 207, and 209 respectively in FIG. 2, or physical partitions, such as boards in a data processing system. A system or partition used in conjunction with an embodiment is intended to include all types of configurations of a data processing system, including but not limited to logical partitions or physical partitions, that are affected by power and thermal domains.

Application 328 may be one or more applications managing power and thermal domains P1-P4 and C1-C3, and the allocation of systems M1-M4 there to. Application 328 may be configured to include an implementation of an embodiment for allocating systems 320-326 to power domains 302-308, and thermal domains 310-314. For example, application 328 may implement a process according to an embodiment described herein. As another example, application 328 may be an existing application, which can be modified to implement a process according to an embodiment described herein. As another example, application 328 may be a part of the platform or service processor firmware.

In accordance with an illustrative embodiment, systems 320-326 have been shown as allocated to power domains 302-308 and thermal domains 310-314 so as to minimize the number of partitions that span domains. For example, portion 330 of system 326 (which includes portion 330) is served power from power domain 304, whereas the remainder of system 326 is served from power domain 306. Of the four power domains, and four systems depicted in this figure, the allocation calls for only system 326 spanning two power domains.

As another example, portion 332 of system 324 (which includes portion 332) is cooled from thermal domain 312, whereas the remainder of system 324 is cooled from thermal domain 310. Of the four thermal domains, and four systems depicted in this figure, the allocation calls for only system 324 spanning two thermal domains.

The allocation in FIG. 3 also shows an example way of allocating systems 320-326 so as to minimize the total number of domains that are used. By allocating in this example manner, three power domains 302-306 are utilized near their capacity and power domain 308 is shown not to have any system or portion thereof allocated there to. Accordingly, power domain 308 can be turned off, saving costs of operation, improving fault tolerance of the depicted system as a whole, and providing enhanced fault isolation. In one embodiment, power domain 308 may be put in a stand-by mode such that power domain 308 can be brought online faster than from a power-off mode.

Similarly, two thermal domains 310-312 are utilized near their capacity and thermal domain 314 is shown not to have any system or portion thereof allocated there to. Accordingly, thermal domain 314 can be turned off, saving costs of operation, improving fault tolerance of the depicted system as a whole, and providing enhanced fault isolation.

Figure 4:
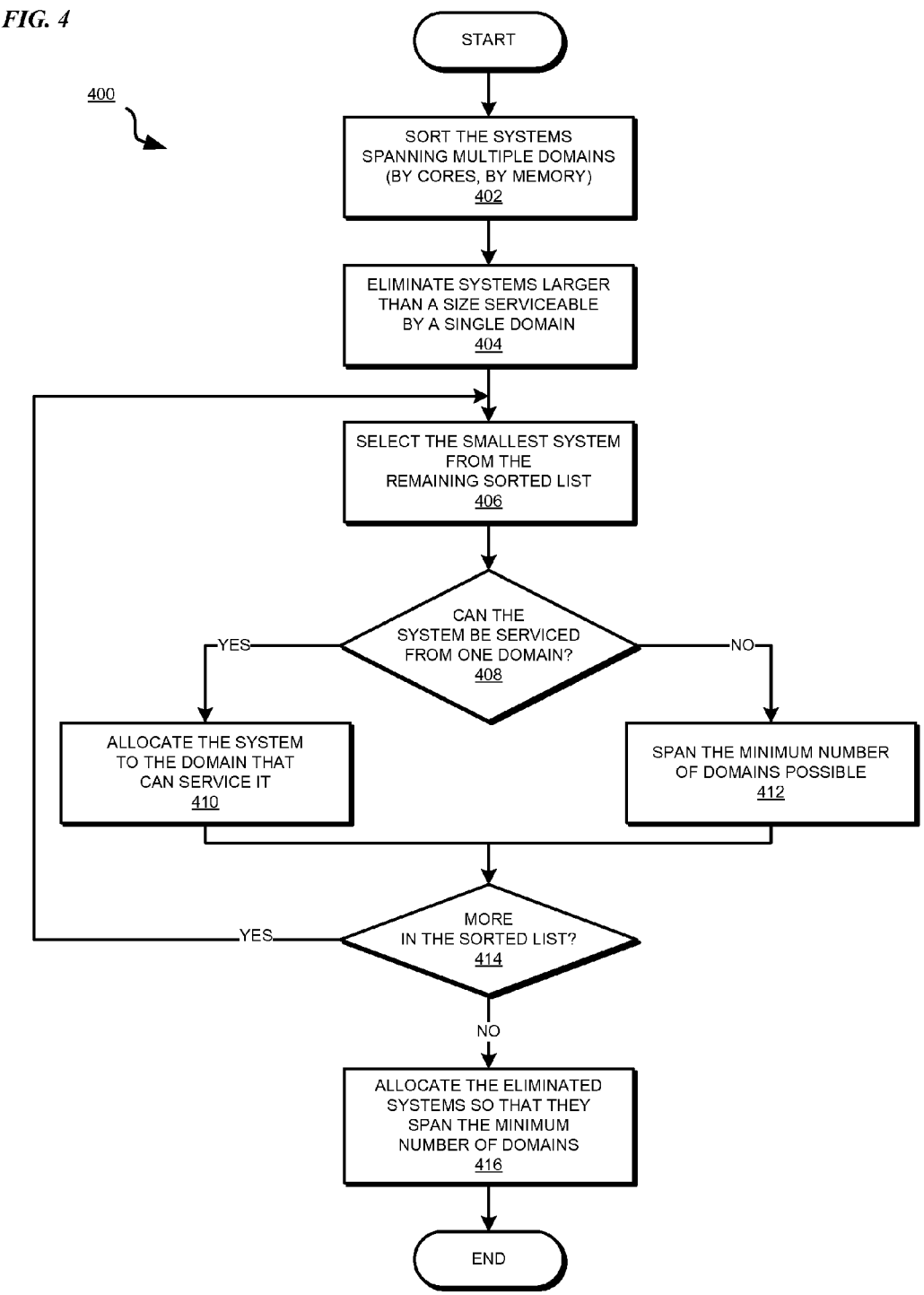
FIG. 4 depicts a flowchart of an example process of initially matching systems to domains in accordance with an illustrative embodiment.

With reference to FIG. 4, this figure depicts a flowchart of an example process of initially matching systems to domains in accordance with an illustrative embodiment. Process 400 may be implemented in an application, such as application 328 in FIG. 3.

Process 400 begins by sorting by size the systems that span multiple domains (step 402). For example, systems can be represented as ordered pairs of number of processors and memory size. Some processors and memory units may be serviced from one domain and other processors and memory units may be serviced from another domain. Associating domains to certain processors and memory units represents a physical form of partitioning the system along domain boundaries. In such an example, step 402 may be accomplished by sorting the systems that span multiple power domains first by the number of processors configured in those systems, and then sorting the systems with comparable number of processors by the size of memory allocated to those systems. Where an initial assignment of systems to domains is not available, such as the systems initiation stage, systems may be hypothetically assigned to domains in any suitable manner before proceeding to step 402.

Process 400 eliminates those systems from the sorted list that are larger than a size serviceable by a single available domain (step 404). For example, any one of the available domains in a given data processing environment may not be able to alone support a sixty-four processor system identified in step 402. Such an example system is eliminated in step 404.

Process 400 selects the smallest system from the remaining sorted list (step 406). Process 400 determines whether the system can be serviced from a single domain (step 408). For example, a domain may normally be able to accommodate a small four-processor system, but may be loaded already with other systems such that given the existing load on the domain, the domain may not be able to accommodate the four-processor system.

If one of the available domains can service the partition selected in step 406 ("Yes" path of step 408), process 400 allocates the system to that domain (step 410). If none of the available domains can service the system selected in step 406 ("No" path of step 408), process 400 selects a minimum number of domains that can service that system, and allocates the system to span those domains (step 412).

Process 400 may try to allocate the system to one of a subset of available domains before taking the "No" path of step 408. An allocated system is removed from the sorted list.

For example, domains P1 and P2 may have available capacity to support one processor each, and domains P3 and P4 may have available capacity to support two processors each. Process 400 may select domains P3 and P4 to support the example four-processor system instead of selecting domains P1, P2, and P3.

Following steps 410 or 412, process 400 determines whether more systems remain in the sorted list (step 414). If more systems remain to be allocated from the sorted list ("Yes" path of step 414), process 400 returns to step 406. If no more systems remain to be allocated from the sorted list ("No" path of step 414), process 400 allocated the eliminated systems so that they may span the minimum number of available domains (step 416). Process 400 ends thereafter.

As an example, step 416 may be implemented in a manner similar to step 412. Furthermore, process 400 may try to allocate a system in step 416 to a domain with most available resources, and then progressively iterate through the combinations of domains that offer most resources in a combination of next minimized number of domains.

Generally, one object of process 400 or a modification thereof is to maximize the number of systems assigned resources from a single domain, and for any system that spans multiple domains, minimize the number of domains spanned. A further object of process 400 is to maximize the amount of resources assigned from that domain to a system where the system has the largest allocation. As to these and other related objectives, certain steps may be added in process 400 (not shown), or modified from the steps that are shown in FIG. 4. The related objectives and the steps to accomplish those objectives will be apparent from this disclosure to these of ordinary skill in the art and the same are contemplated within the scope of the invention.

Operating in this manner, process 400 performs an initial allocation or matching of systems to power and thermal domains. In one embodiment, once the allocation has been performed, the systems can continue as allocated until a new system enters the configuration or a configured system leaves the configuration. For example, a new partition may be brought online using processors that were dormant at the initial allocation by process 400, creating new demand for power or cooling resources, and warranting re-allocation. As another example, a partition that was allocated by process 400 may be terminated and domain capacity may become available warranting reallocation.

In another embodiment, the allocation can be iteratively monitored and adjusted based on the changing needs of the configured systems. For example, a system may have been initially allocated to span two domains because of the existing loads on those two domains. During operation, one of domains may have increased resource availability, such as due to a processor being removed from a partition on that domain. A monitoring of domain resource utilization may prompt a dynamic re-allocation of the system across available domains, perhaps to transition the system from spanning the two example domains to the example single domain with increased resource availability.

Figure 5:
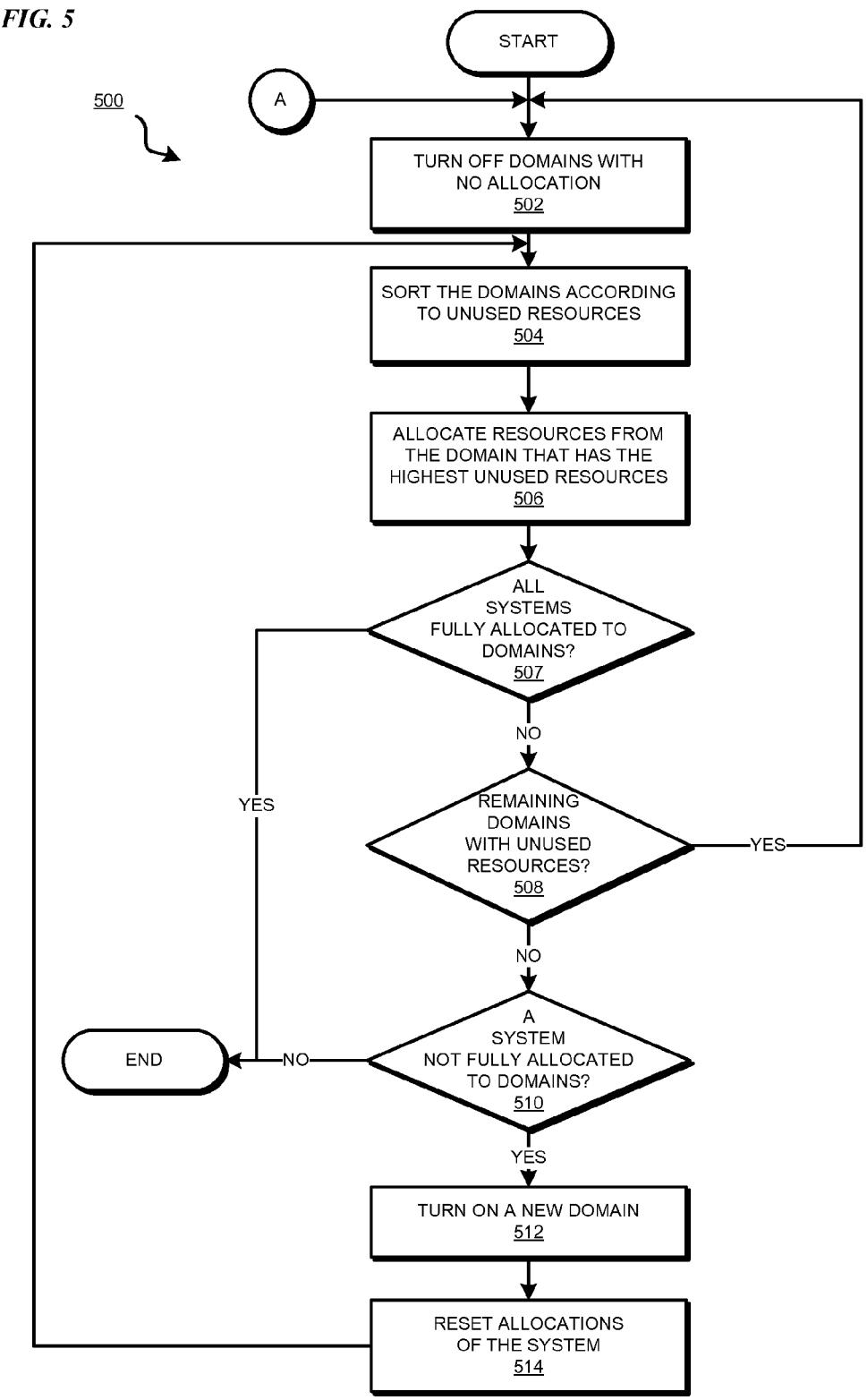
FIG. 5 depicts a flowchart of an example process of turning domains on or off for allocating systems to domains in accordance with an illustrative embodiment.

With reference to FIG. 5, this figure depicts a flowchart of an example process of turning domains on or off for allocating systems to domains in accordance with an illustrative embodiment. Process 500 may be implemented using application 328 in FIG. 3.

If not already turned off, process 500 begins by turning off those domains that have no systems allocated to them (step 502). Another process, such as process 600 in FIG. 6 may enter process 500 at step 502 via entry point labeled "A".

Process 500 sorts the domains according to their respective unused or unallocated resources (step 504). Process 500 allocates resources first from the domain that has the highest amount of unused or unallocated resources (step 506). Upon allocating one or more systems in step 506, process 500 determines whether all systems have been fully allocated to the domains (step 507). If all systems have been fully allocated ("Yes" path of step 507), process 700 ends thereafter. If some systems remain to be allocated ("No" path of step 507), process 700 the remaining domains still have unused or unallocated resources (step 508). If the available domains still have unused or unallocated resources ("Yes" path of step 508), process 500 returns to step 502 or optionally to step 504 (return to step 504 not shown).

If no domains with unused or unallocated resources remain among the operational domains ("No" path of step 508), process 500 determines whether a system has not been fully allocated to one or more operational domains (step 510). If no such system remains ("No" path of step 510), process 500 ends thereafter. If a system remains incompletely allocated to the operating domains ("Yes" path of step 510), process 500 turns on a new domain that was previously turned off (step 512). Process 500 may complete the allocation of the incompletely allocated system from the newly turned on domain (not shown), or optionally reset the allocations of certain systems, and add the newly powered on domain to the list of operational domains so that the systems can be allocated resources from all available domains including the newly turned on domain (step 514). Process 500 may then return to step 502 (shown) or 504 (not shown).

Figure 6:
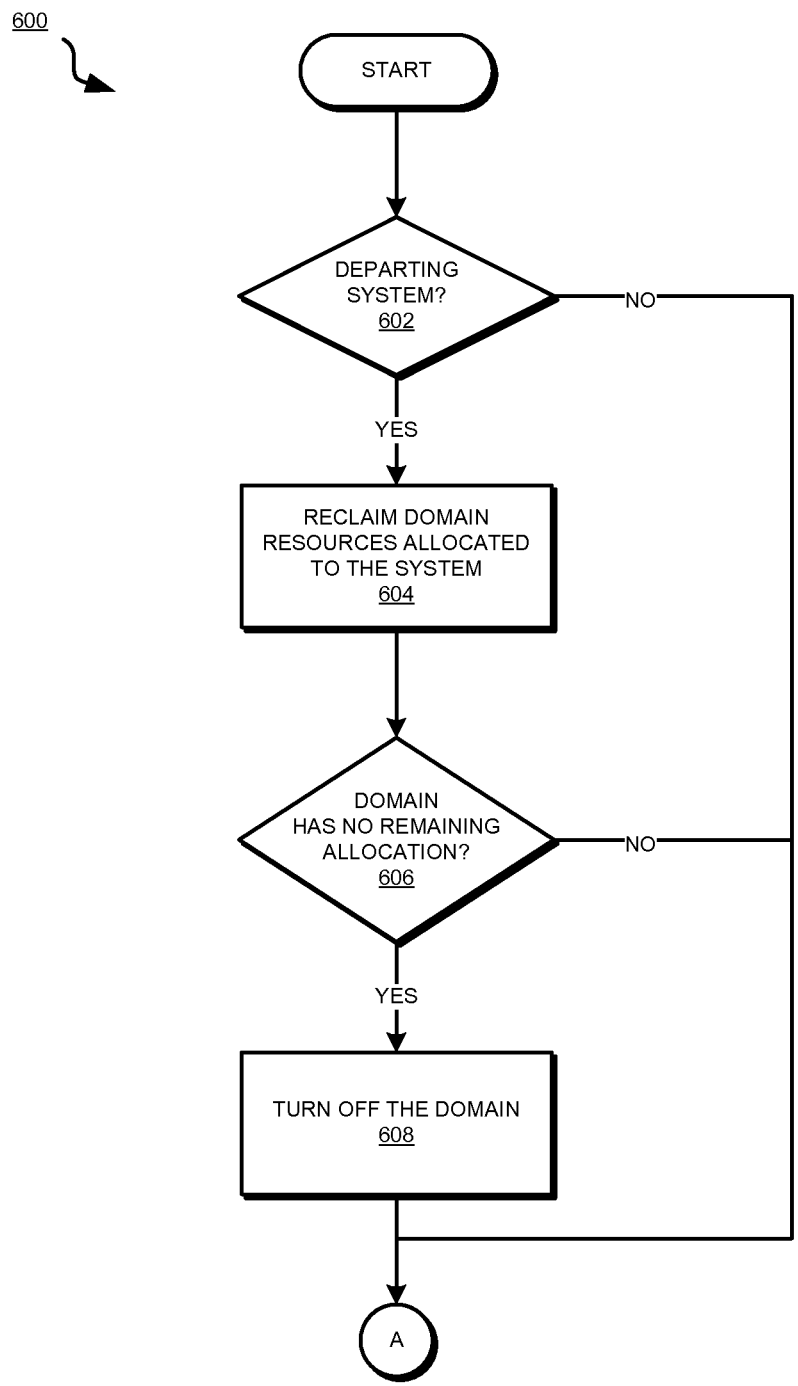
FIG. 6 depicts a flowchart of an example process of allocating systems to domains upon the arrival or departure of a system from an allocation in accordance with an illustrative embodiment.

With reference to FIG. 6, this figure depicts a flowchart of an example process of allocating systems to domains upon the arrival or departure of a system from an allocation in accordance with an illustrative embodiment. Process 600 can be implemented in application 328 in FIG. 3.

Process 600 begins by determining whether a system is departing a configuration of system-domain allocation (step 602). If the system is departing or has departed ("Yes" path of step 602), a system to which resources of a domain were allocated has no further use of those resources and process 600 reclaims those domain resources (step 604). After the reclaiming, process 600 determines whether the domain to which those reclaimed resources belong has any remaining allocation, to wit, whether any other system is allocated resources from that domain (step 606). If allocations remain for that domain ("No" path of step 606), process 600 exits via exit point labeled "A" to enter another process, such as process 500 in FIG. 5, via a corresponding entry point labeled "A". Such an entry into process 500 of FIG. 5 allows for the remaining systems to be reallocated to the available domains in accordance with an illustrative embodiment.

If no allocations remain for that domain ("Yes" path of step 606), process 600 turns off that domain (step 608). Process 600 exits via exit point labeled "A" to enter another process, such as process 500 in FIG. 5, via a corresponding entry point labeled "A". Such an entry into process 500 of FIG. 5 allows for the remaining systems to be reallocated to the remaining domains in accordance with an illustrative embodiment.

In step 602, if a system is not departing, a system must be arriving into the allocation configuration for process 600 to be executed. If a system is arriving into the configuration creating new demand for domain resources ("No" path of step 602), process 600 exits via exit point labeled "A" to enter another process, such as process 500 in FIG. 5, via a corresponding entry point labeled "A". Such an entry into process 500 of FIG. 5 allows for the new combination of systems to be reallocated to the available domains in accordance with an illustrative embodiment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for matching systems with power and thermal domains in a data processing environment. Using an embodiment of the invention in an example implementation, better power distribution and thermal control may be obtained as compared to either system by system provisioning of power and cooling resources or allocation on a first come basis.

An embodiment thus enables a system-placement, to wit, allocate a system to a domain, with an awareness of the power domains and the thermal domains existing in and servicing a data processing environment. An embodiment recognizes the boundaries of (or capacities available from) the various domains and attempts to allocate systems or parts thereof to the domains to maximize the utilization of the domains while minimizing the number of active domains.

Allocating systems to power domains, thermal domains, or both types of domains, an embodiment may also reduce the probability of a system failure due to a power component's failure because the allocation relies on fewer components (as some of the domains can be turned off). Using an embodiment, redundant systems, such as redundant partitions, can be allocated to different domains, thereby reducing the probability of failure by the aggregate partition.

An embodiment also allows improved power and thermal capacity measurements as the measurements are localized to a smaller number of domains. An embodiment may also facilitate containing power viruses to a smaller number of systems because an embodiment attempts to maximize systems' allocation to single domains and avoid spanning multiple domains. Furthermore, the effects of power viruses can be limited by shifting systems from an affected domain to an unaffected domain (e.g., a domain that was previously turned off and is therefore not affected by the power virus). An embodiment may also speed-up the process of node evacuation and node restart by reducing node interdependencies and the number of partitions that have to be moved under such circumstances.

Although an embodiment may be described with respect to sorting the systems according to their respective sizes based on the systems' processors, memory, or other similar consideration, the embodiments are not limited to such a size-based method of sorting. For example, in one embodiment, the sorting may take into consideration the relative priorities of the systems, allocating a higher priority system to the available domains before allocating lower priority systems.

Those of ordinary skill in the art will be able to conceive from this disclosure other metrics that may be usable for sorting the systems. Such other metrics are within the contemplations of the invention and an embodiment may utilize any other suitable metric to sort the systems that are to be allocated to the available domains within the scope of the invention. For example, a metric used for sorting the systems or domains may be an optimizing metric, such as a metric based on achieving the smallest number of domains given a particular set of systems. As another example, another metric may be based on achieving the least number of domains to which a critical or high priority system is assigned in a given data processing environment. As another example, another metric may be based on achieving the smallest average number of domains per system in a given data processing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Plash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code which, when executed by a processor, causes the processor to allocate a set of systems to a set of domains, the computer usable code comprising:

computer usable code for sorting a subset of the set of systems according to size to form a sorted list of systems;

computer usable code for selecting a smallest remaining system in the sorted list of systems;

computer usable code for allocating the smallest remaining system to a domain responsive to a determination that the domain can service the smallest remaining system; and computer usable code for allocating a system from a second subset to a plurality of domains such that the plurality of domains includes a smallest number of domains from the set of domains.

2. The computer usable program product of claim 1, further comprising:

computer usable code for allocating the smallest remaining system to a plurality of domains responsive to a determination that a single domain cannot service the smallest remaining system such that the plurality of domains includes a smallest number of domains from the set of domains.

3. The computer usable program product of claim 1, further comprising:
computer usable code for one of (i) turning off and (ii) putting in stand-by mode, a domain in the set of domains when no system from the set of systems is allocated to the domain.

4. The computer usable program product of claim 1, further comprising:
computer usable code for sorting the set of domains in order of resources available for allocation to systems in the set of systems, forming a sorted list of domains; and
computer usable code for allocating resources, to a system in the set of systems, from that domain in the sorted list of domains that has highest available resources.

5. The computer usable program product of claim 1, further comprising:
computer usable code for determining whether each system in the set of systems has been completely allocated from the set of domains;
computer usable code for turning on a different domain responsive to a system not being completely allocated from the set of domains, wherein the different domain is previously one of (i) turned off and (ii) in a stand-by mode; and
computer usable code for adding a turned on domain to the set of domains.

6. The computer usable program product of claim 5, further comprising:
computer usable code for allocating one of (i) resources from the turned on domain to the system that was not completely allocated, and (ii) resetting allocations of a subset of systems in the set of systems and re-allocating that subset of systems to the set of domains including the turned on domain.

7. The computer usable program product of claim 1, further comprising:
computer usable code for detecting that a system in the set of systems is not using resources allocated from a domain in the set of domains;
computer usable code for reclaiming the resources not being used by the system; and
computer usable code for reallocating the reclaimed resources such that a plurality of domains serving a system is reduced to a singularity.

8. The computer usable program product of claim 1, wherein the computer usable code is stored in a non-transitory computer readable storage medium in a data processing system, and wherein the computer usable code is transferred over a network from a remote data processing system.

9. The computer usable program product of claim 1, wherein the computer usable code is stored in a non-transitory computer readable storage medium in a server data processing system, and wherein the computer usable code is downloaded over a network to a remote data processing system for use in a non-transitory computer readable storage medium associated with the remote data processing system.

10. A data processing system for allocating a set of systems to a set of domains, the data processing system comprising:
a storage device including a storage medium, wherein the storage device stores computer usable program code; and
a processor, wherein the processor executes the computer usable program code, and wherein the computer usable program code comprises:
computer usable code for sorting a subset of the set of systems according to size to form a sorted list of systems;
computer usable code for selecting a smallest remaining system in the sorted list of systems;
computer usable code for allocating the smallest remaining system to a domain responsive to a determination that the domain can service the smallest remaining system; and
computer usable code for allocating a system from a second subset to a plurality of domains such that the plurality of domains includes a smallest number of domains from the set of domains.

* * * * *